US011585656B2

(12) United States Patent
Amano et al.

(10) Patent No.: US 11,585,656 B2
(45) Date of Patent: Feb. 21, 2023

(54) SENSOR CONTROL DEVICE

(71) Applicant: Pioneer Corporation, Tokyo (JP)

(72) Inventors: Katsumi Amano, Kawagoe (JP); Reiji Matsumoto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 517 days.

(21) Appl. No.: 16/637,662

(22) PCT Filed: Aug. 2, 2018

(86) PCT No.: PCT/JP2018/028973
§ 371 (c)(1),
(2) Date: Feb. 7, 2020

(87) PCT Pub. No.: WO2019/031372
PCT Pub. Date: Feb. 14, 2019

(65) Prior Publication Data
US 2020/0166339 A1 May 28, 2020

(30) Foreign Application Priority Data
Aug. 9, 2017 (JP) .............................. JP2017-154121

(51) Int. Cl.
*G01C 7/04* (2006.01)
*G01C 15/00* (2006.01)
*G01S 7/4861* (2020.01)
*G01S 17/88* (2006.01)

(52) U.S. Cl.
CPC .............. *G01C 7/04* (2013.01); *G01C 15/00* (2013.01); *G01S 7/4861* (2013.01); *G01S 17/88* (2013.01)

(58) Field of Classification Search
CPC ........................................................ G01C 7/04
See application file for complete search history.

(56) References Cited

U.S. PATENT DOCUMENTS

| 9,719,801 B1 | 8/2017 | Ferguson et al. | |
| 9,864,047 B2* | 1/2018 | Koehler | G01S 7/4873 |
| 10,965,099 B2* | 3/2021 | Kitano | H01S 5/0428 |

(Continued)

FOREIGN PATENT DOCUMENTS

| JP | 2005134231 A | 5/2005 |
| JP | 2007-232381 A | 9/2007 |
| JP | 2011-196916 A | 10/2011 |

(Continued)

OTHER PUBLICATIONS

International Search Report and Written Opinion for related International Application No. PCT/JP2018/028973, dated Oct. 30, 2018; English translation of ISR provided (9 pages).

(Continued)

*Primary Examiner* — Michael A Berns
(74) *Attorney, Agent, or Firm* — Procopio, Cory, Hargreaves & Savitch LLP (57) ABSTRACT

A control unit of the sensor control device controls sensor based on the planimetric feature information related to the planimetric features and the sensor information related to the sensors. Thereby, while the sensors are appropriately operated as necessary, and the detailed current information of the planimetric feature is acquired by the sensors, the total data size of the information acquired by the sensors can be reduced.

13 Claims, 5 Drawing Sheets

(56) References Cited

U.S. PATENT DOCUMENTS

2015/0268331 A1    9/2015   Koehler et al.
2018/0254607 A1    9/2018   Kitano

FOREIGN PATENT DOCUMENTS

| JP | 2013-156138 A | 8/2013 |
| JP | 2017-072422 A | 4/2017 |
| WO | 2017/060965 A1 | 4/2017 |

OTHER PUBLICATIONS

Japanese Patent Office, Notice of Reasons for Refusal, JP 2019-535149, dated Dec. 17, 2021, in 8 pages.
Extended European Search Report dated Apr. 1, 2021 in counterpart EP Patent Application No. 18843688.5, 9 pages.

* cited by examiner

SENSOR CONTROL DEVICE

CROSS-REFERENCE TO RELATED APPLICATIONS

This application is a U.S. National Stage entry of PCT Application No: PCT/JP2018/028973 filed Aug. 2, 2018, which claims priority to Japanese Patent Application No. 2017-154121, filed Aug. 9, 2017, the contents of which are incorporated herein by reference.

TECHNICAL FIELD

The present invention relates to a control device that controls a sensor capable of acquiring current information of a planimetric feature.

BACKGROUND ART

In general, a moving object such as a vehicle may be provided with a sensor for recognizing a planimetric feature or another moving object located on or around the moving path. As such a moving object, one having a plurality of laser radars as sensors has been proposed (refer to, for example, Patent Literature 1). The moving object described in Patent Literature 1 measures on-road planimetric features by scanning a laser beam.

PRIOR ART DOCUMENT

Patent Literature

Patent Literature 1: JP 2011-196916 A

SUMMARY OF INVENTION

Technical Problem

However, when the moving object moves, the planimetric features pass through the surroundings as viewed from the moving object. Therefore, in a moving object equipped with a laser radar as described in Patent Literature 1, if it is attempted to always measure on-road planimetric features during traveling, the data size of the measurement data becomes enormous. At this time, if the sensing accuracy and measurement frequency are reduced, the data size can be reduced, but there is a possibility that necessary information about the planimetric feature cannot be obtained.

Therefore, an object of the present invention is to provide a sensor control device that can reduce the total data size of information acquired by the sensor while acquiring current information of the planimetric feature by the sensor as an example.

Solution to Problem

According to a first aspect of the present invention, there is provided a sensor control device including:

a first acquisition unit that acquires planimetric feature information related to a planimetric feature;

a second acquisition unit that acquires sensor information related to a sensor capable of acquiring current information of the planimetric feature; and a control unit that controls the sensor based on the planimetric feature information acquired by the first acquisition unit and the sensor information acquired by the second acquisition unit.

According to a second aspect of the present invention, there is provided a sensor control method used by a sensor control device including the steps of:

a first acquisition step that acquires planimetric feature information related to a planimetric feature;

a second acquisition step that acquires sensor information related to a sensor capable of acquiring current information of the planimetric feature; and a control step that controls the sensor based on the planimetric feature information acquired by the first acquisition step and the sensor information acquired by the second acquisition step.

DESCRIPTION OF EMBODIMENTS

Hereinafter, an embodiment of the present invention will be described. A sensor control device according to an embodiment of the present invention includes: a first acquisition unit that acquires planimetric feature information related to a planimetric feature; a second acquisition unit that acquires sensor information related to a sensor capable of acquiring current information of the planimetric feature; and a control unit that controls the sensor based on the planimetric feature information acquired by the first acquisition unit and the sensor information acquired by the second acquisition unit.

According to such a sensor control device of the present embodiment, the sensor can be appropriately operated as necessary by controlling the sensor based on the planimetric feature information related to the planimetric feature and the sensor information related to the sensor. Moreover, the total data size of the information acquired by the sensor can be reduced while acquiring detailed current information of the planimetric feature by the sensor.

Preferably, the sensor control device further includes: a current position information acquisition unit that acquires current position information of the sensor or a moving object in which the sensor is arranged, the planimetric feature information includes planimetric feature position information related to the position of the planimetric feature, and the sensor information includes recognizable range information related to a recognizable range by the sensor. Further preferably, when the position indicated by the planimetric feature position information is within the recognizable range (in other words, if it is determined that the current information of the planimetric feature can be acquired by the sensor), the control unit operates the sensor in a first state (for example, high sensitivity state with high sensing sensitivity), and when the position indicated by the planimetric feature position information is outside the recognizable range (in other words, when it is determined that the current information of the planimetric feature cannot be acquired by the sensor), the control unit operates the sensor in a second state (for example, low sensitivity state with low sensing sensitivity). As a result, when it is determined that the current information of the planimetric feature can be acquired, the current information of the detailed planimetric feature is acquired by the sensor, and when it is determined that the current information of the planimetric feature cannot be acquired, the data size of the information acquired by the sensor can be reduced. Note that operating the sensor in the second state includes operating the sensor so that the output from the sensor becomes zero (that is, sensing is not performed).

At this time, the sensor may increase at least one of the number of measurements in a predetermined scan range and the energy consumption per measurement in the first state than in the second state. In this way, it is possible to efficiently acquire the current information of the planimetric feature.

The sensor information may include detailed recognition range information regarding an approach recognition range in the recognizable range and a normal recognition range outside the approach recognition range in the recognizable range. When a position indicated by the planimetric feature position information is located within the normal recognition range, the control unit may operate the sensor in a first high sensitivity state, and when the position indicated by the planimetric feature position information is located within the approach recognition range, the control unit may operate the sensor in a second high sensitivity state. The sensor may operate at a lower sensitivity in the second high sensitivity state than in the first high sensitivity state. Thereby, the data size of the information which the sensor acquires can be reduced. Further, it is possible to perform control in consideration of the influence on the human body such as electromagnetic waves radiated from the sensor. In addition, the approach recognition range may be set as appropriate depending on the performance of the sensor.

Preferably, the control unit may be configured to be capable of controlling the plurality of sensors, and may independently control the plurality of sensors based on the planimetric feature information and the sensor information of each of the plurality of sensors. Thereby, each sensor can be operated appropriately. For example, when sensors are provided on both sides in the width direction of the moving object, such control can be performed that when the planimetric feature is located on one side in the width direction with respect to the moving object, the sensor on the other side does not sense, and the sensor on the one side switches between the first state and the second state based on whether or not the position indicated by the planimetric feature position information is within the recognizable range.

Preferably, the sensor control device may further include: an external output unit for outputting the current information acquired by the sensor to an outside. Thereby, the current information of the planimetric feature can be collected in the external server or the like, and the map data stored in the external server or the like can be updated. More preferably, a plurality of moving objects is provided with sensors and sensor control devices, and current information of the planimetric features is output from an external output unit of each sensor control device to a common external server. Thereby, the map data stored in the external server can be updated widely and frequently, and the accuracy of map data can be improved.

The sensor may include a projection unit that projects an electromagnetic wave, and a reception unit that receives a reflected wave of the electromagnetic wave from the planimetric feature. Further, the sensor may be arranged in a moving object, and can obtain as the current information, at least one of information related to an on-route planimetric feature located on a route of the moving object and information related to a peripheral planimetric feature located around the route.

Further, a sensor control method used by a sensor control device according to an embodiment of the present invention includes the steps of: a first acquisition step that acquires planimetric feature information related to a planimetric feature; a second acquisition step that acquires sensor information related to a sensor capable of acquiring current information of the planimetric feature; and a control step that controls the sensor based on the planimetric feature information acquired by the first acquisition step and the sensor information acquired by the second acquisition step. According to such a sensor control method of the present embodiment, as in the sensor control device described above, the sensor is operated appropriately as necessary, and while the sensor acquires detailed current information of the planimetric feature, the total data size of the information to be acquired can be reduced.

Moreover, the sensor control method mentioned above may be performed by a computer as a sensor control program. In this way, the total data size of the information which a sensor acquires can be reduced, while acquiring the detailed present information of the planimetric feature with the sensor using the computer.

Further, the above-described sensor control program may be stored in a computer-readable recording medium. In this way, the program can be distributed as a single unit in addition to being incorporated into the device, and version upgrades can be easily performed.

Embodiment

Figure 1:
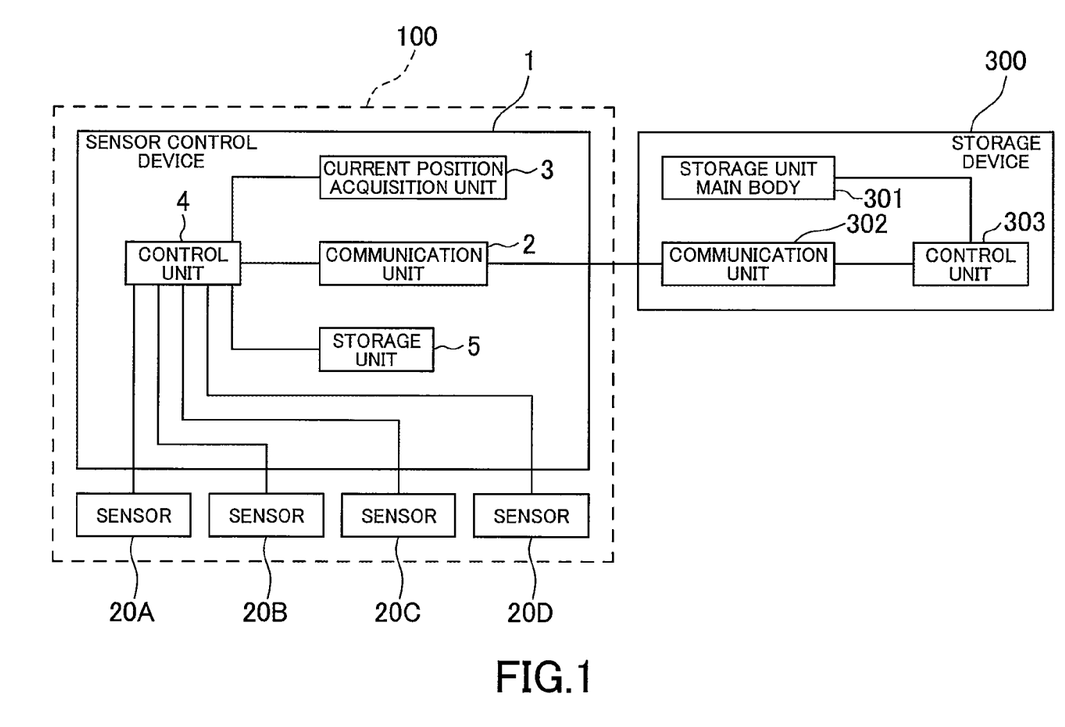
FIG. 1 is a block diagram showing an outline of a sensor control device according to an embodiment of the present invention and an external server communicating with the sensor control device.
Figure 2:
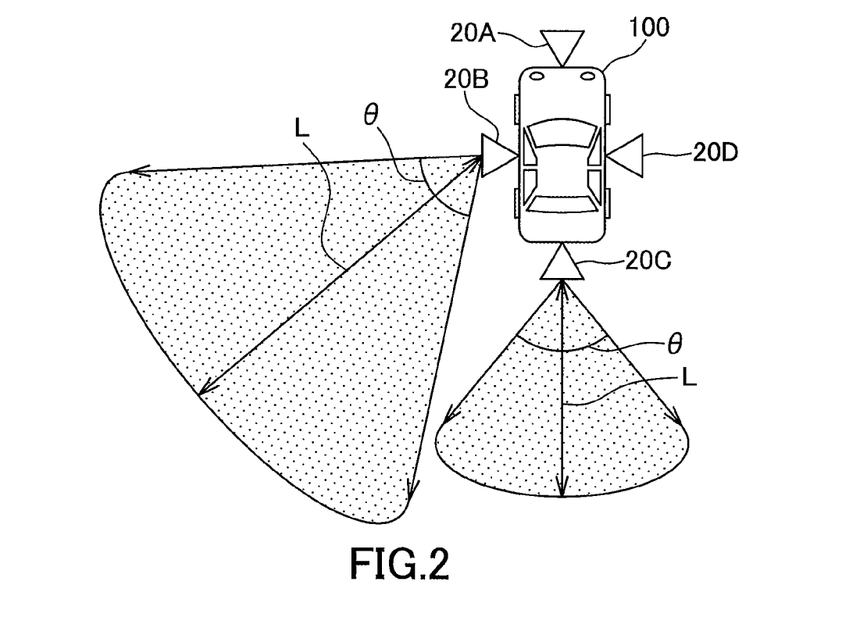
FIG. 2 is a plan view showing a state in which the sensor control device is arranged on a moving object.
Figure 3:
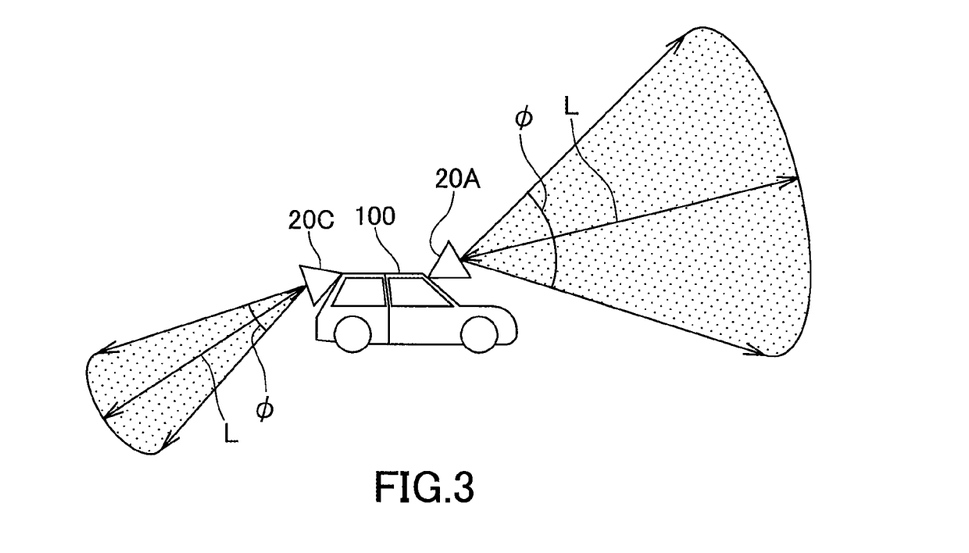
FIG. 3 is a side view showing a state in which the sensor control device is arranged on the moving object.

Hereinafter, an embodiment of the present invention will be specifically described below. The sensor control device 1 is disposed in a vehicle 100 as a moving object, and as shown in FIG. 1, is provided with a communication unit 2, a current position acquisition unit 3, a control unit 4, and a storage unit 5. In the present embodiment, as shown in FIGS. 2 and 3, a total of four sensors 20A to 20D are provided on each of the front, rear, left and right sides of the vehicle 100. Incidentally, the vehicle 100 may be a measurement vehicle for collecting road information and current information on planimetric features, or a general vehicle for the purpose of passenger movement, passenger transportation, and carriage.

The sensor control device 1 communicates with a storage device (external server) 300. The external server 300 includes a storage unit main body 301, a communication unit 302, and a control unit 303.

Each of the sensors 20A to 20D includes a projecting unit that projects an electromagnetic wave and a receiving unit that receives a reflected wave of the electromagnetic wave from an irradiation target (a planimetric feature to be described later). These sensors may be optical sensors (so-called LIDAR; Laser Imaging Detection and Ranging) that project light and receive reflected light from an irradiation object. In the following description, it is assumed that the sensors 20A to 20D are optical sensors. By processing the output signals output from the sensors 20A to 20D, it becomes possible to recognize the direction in which the laser light is projected and an object positioned closer than the longest recognition distance L according to the intensity of the laser light. Note that the longest recognition distance L means a distance at which the reflected light has an intensity that can be recognized by the light receiving unit when the irradiated laser light is reflected by the object and reaches the light receiving unit. Further, the sensors 20A to 20D each have a pair of an angle range $\theta$ in a direction in which laser light can be irradiated in a horizontal plane and an angle range $\phi$ in a direction in which laser light can be irradiated in the vertical direction. Accordingly, the recognizable range of each of the sensors 20A to 20D includes a fan-shaped area determined by the longest recognition distance L and the angle range $\theta$ in plan view, and a fan-shaped area determined by the longest recognition distance L and the angle range $\phi$ in front view and side view.

The longest recognition distance L and the angle ranges $\theta$ and $\phi$ as described above are stored in the storage unit 5 as a database. That is, the storage unit 5 stores recognizable range information regarding a range in which each sensor can acquire the current information of the planimetric feature (a range in which the sensor can recognize the planimetric feature) as sensor information regarding the sensors 20A to 20D. Note that the sensors 20A to 20D may have different performances, and the storage unit 5 stores sensor information for each of the sensors 20A to 20D.

Further, the storage unit 5 also stores detailed recognition range information regarding the approach recognition range in the recognizable range and the normal recognition range outside the approach recognition range in the recognizable range as sensor information. The approach recognition range is a range determined in consideration of the influence on the human body, and may be set as appropriate according to the performance of the sensors 20A to 20D. An example of sensor information stored in the storage unit 5 in this way is shown in Table 1.

TABLE 1

| | Recognizable range | | | Approach recognition range | | |
|---|---|---|---|---|---|---|
| | Longest recognition distance | Angle range $\theta$ | $\phi$ | Approach recognition distance | Angle range $\theta'$ | $\phi'$ |
| Sensor 20A | L1 | $\theta_1$ | $\phi_1$ | L1' | $\theta'_1$ | $\phi'_1$ |
| Sensor 20B | L2 | $\theta_2$ | $\phi_2$ | L1' | $\theta'_2$ | $\phi'_2$ |
| Sensor 20C | L3 | $\theta_3$ | $\phi_3$ | L1' | $\theta'_3$ | $\phi'_3$ |
| Sensor 20D | L4 | $\theta_4$ | $\phi_4$ | L1' | $\theta'_4$ | $\phi'_4$ |

Here, the control unit 4 may perform control to continuously change the recognition sensitivity of each of the sensors 20A to 20D. Alternatively, the control unit 4 may perform control for simply turning on and off each of the sensors 20A to 20D. Note that the recognition sensitivity is determined by the number of measurements when scanning a predetermined scan range (number of times the projection unit emits laser light per unit time), energy consumption per measurement (intensity of laser light irradiated by projection unit), and the like. That is, the greater the number of times of measurement (number of times of laser light irradiation) in a predetermined scan range, the higher the recognition sensitivity, and the greater the energy consumed per measurement (intensity of the laser beam to be irradiated), the higher the recognition sensitivity.

The communication unit 2 includes a circuit and an antenna for communicating with a network such as the Internet or a public line, and communicates with the external server 300 to transmit/receive information. The communication unit 2 acquires map information and planimetric feature information related to the planimetric feature from the external server 300. The acquisition timing from the server 300 may be before the start of traveling of the vehicle or during traveling. The acquired map information and planimetric feature information may be stored in the storage unit 5. This planimetric feature information includes planimetric feature position information related to the position of the planimetric feature. Further, as will be described later, the communication unit 2 outputs the current feature information acquired by the sensors 20A to 20D to the outside and functions as an external output unit.

Here, the planimetric feature is a concept including any natural or artificial object existing on the ground. Examples of the planimetric feature include an on-route planimetric feature located on the route (that is, a road) of the vehicle and a peripheral planimetric feature located on the periphery of the road. Examples of on-route planimetric features include road signs, traffic lights, guardrails, pedestrian bridges, and the like, including the road itself. That is, the characters and figures depicted on the road surface and the shape of the road (road width and curvature) are also included in the on-route planimetric feature. Moreover, Examples of peripheral planimetric features include a building (a house, a store) or a signboard located along a road. Further, the planimetric feature information is information related to the above-described planimetric feature. Examples of information included in the planimetric feature information include planimetric feature location information that indicates the location of the planimetric feature (including planimetric location information that indicates the absence of the planimetric feature when the planimetric feature is removed), feature point information indicating features such as the shape of the planimetric feature obtained by analyzing images and images obtained by capturing the planimetric feature in advance, the change point information recording the change in the shape of the planimetric feature in the secular change of the planimetric feature, and the like. In other words, by using sensors, it becomes possible to acquire (collect) the current information of the planimetric feature, thereby recognizing the planimetric feature itself as well as recognizing changes in the planimetric feature, absence of the planimetric feature, etc.

The sensors 20A to 20D are sensors that can acquire current information of the planimetric feature by recognizing (detecting) the above-described planimetric feature. Recognition of planimetric features by the sensors 20A to 20D includes not only recognition of the outer shape of the planimetric feature, recognition of the surface of the planimetric feature, and the presence of the planimetric feature, but also recognition of changes in planimetric features and the removal of such planimetric features. For example, when the sensors 20A to 20D recognize a road sign as the planimetric feature, a figure written on the road sign may be recognized, or a surface state (such as paint peeling or fading) may be recognized. Moreover, the sensors may recognize states, such as that the direction of a marker is changing and the marker which should exist (it existed in the past) has been removed.

The current position acquisition unit 3 is a GPS receiving unit that receives radio waves transmitted from a plurality of GPS (Global Positioning System) satellites and obtains current position information of the vehicle 100 as known. In addition, the GPS receiving unit arranged in the vehicle as a part of navigation device may be used as the current position acquisition unit 3. Note that the positions of the sensors 20A to 20D may be the same as the current position of the vehicle, or may be calculated based on the current position information of the vehicle and information related to the attachment location (arrangement location) in the vehicle. Information regarding the attachment location may be stored in advance in a memory or the like. That is, the current position acquisition unit 3 may function as a current position information acquisition unit by directly using the acquired current position information of the vehicle 100 as the current position information of the sensors 20A to 20D, and may function as a current position information acquisition unit by appropriately correcting the acquired current position information of the vehicle 100 and using the current position information of the sensors 20A to 20D.

The planimetric feature information acquired by the communication unit 2 from the external server 300 includes planimetric feature position information. The control unit 4 calculates the distance between the planimetric feature and the sensors 20A to 20D based on the planimetric feature position information included in the planimetric feature information acquired by the communication unit 2 and the current position information acquired by the current position acquisition unit 3. Note that when there is a deviation between the position of the planimetric feature estimated using the distance between the sensors 20A to 20D calculated using the output signals of the sensors 20A to 20D and the current position information acquired by the current position acquisition unit 3 and the planimetric feature and the planimetric feature position information included in the planimetric feature information, the current position information may be calibrated using the deviation amount.

The control unit 4 is configured by a CPU (Central Processing Unit) having a memory such as a RAM (Random Access Memory) or a ROM (Read Only Memory), for example, and governs overall control of the sensor control device 1. Further, the control unit 4 also acquires sensor information of the sensors 20A to 20D from the storage unit 5 and functions as a second acquisition unit.

The storage unit 5 is composed of, for example, a hard disk or a non-volatile memory, stores sensor information of the sensors 20A to 20D, map information and planimetric feature information acquired from the external server 300, a control program of the control unit 4, mathematical formulas and tables necessary for various calculations, and is read/written by control from the control unit 4.

The storage unit main body 301 of the external server 300 is configured by, for example, a hard disk or a non-volatile memory, stores the above-described map information and planimetric feature information, and is read/written by control from the control unit 303. In addition, the storage unit main body 301 may store the map information and the planimetric feature information separately as described above, or may store the map information integrally (that is, the planimetric feature information is included in the map information) due to the data structure of the storage. In addition, when acquiring the map data as described above, the sensor control device 1 does not necessarily need to acquire this from the external server 300, and packaged planimetric feature data may be pre-installed. Further, map data may be acquired when a planimetric feature data transmission process described later is executed.

The planimetric feature information stored in the storage unit main body 301 includes planimetric feature data. This planimetric feature data has a data structure (feature data structure) including at least one of recognized information about a recognizable range in which a planimetric feature can be recognized by a sensor, and permission information about permission or non-permission of sensing by a sensor. The recognizable range indicates a range where it is predicted that the planimetric feature can be recognized when the sensor is in the recognizable range. The recognizable range is set according to, for example, the size of the planimetric feature, the shape of the planimetric feature, the position of the planimetric feature (for example, the height from the ground), the reflectance of the planimetric feature with respect to the electromagnetic wave (for example, light), and the like. Note that the recognized information may at least include information about the longest distance. That is, a circular two-dimensional area within the longest distance centered on the planimetric feature may be a recognizable range, or a spherical three-dimensional area within the longest distance centering on the planimetric feature may be the recognizable range. Note that the recognizable range is not limited to a circle or a sphere, but may be a shape obtained by changing a circle or a sphere according to the shape of the planimetric feature. Further, in addition to the longest distance, the recognizable range may be set according to the arrangement of the planimetric features. For example, for a planimetric feature arranged along a road, a recognizable range may be set only on the road side to form a semicircular or hemispherical recognizable range. In addition, for a planimetric feature with front and back such as a signboard, a recognizable range may be set only on the surface side, and a semicircular or hemispherical recognizable range may be set. Further, the recognized information may be one piece of information for each planimetric feature or a plurality of pieces of information. For example, the range in which the sensor can recognize a planimetric feature varies depending on the type and specs of the assumed sensor. For this reason, the planimetric feature data may include a plurality of pieces of recognized information indicating different recognizable ranges depending on the type and specifications of the sensor.

The permission information is information indicating whether the sensor is permitted to recognize the planimetric feature information. An example of the permission information is information that allows sensing to be performed when the vehicle 100 (or the sensors 20A to 20D) is located in the recognizable range, and prohibits sensing when the vehicle 100 is not located in the recognizable range. Such a planimetric feature data structure is created by the time of execution of the second sensor control process described later, and is stored in the storage unit main body 301 as a part of the map information or the planimetric feature information (storage step). Note that the planimetric feature data structure does not have to be created for all the planimetric features, but may be created for planimetric features that are to be preferentially measured by the sensors 20A to 20D (that is, have high importance). For example, when a moving object in which a sensor is arranged performs self-position estimation, the estimation accuracy may be improved by using information on a result of sensing the surrounding planimetric features by the sensor. In this case, the result of sensing road signs arranged at appropriate intervals on the road may be used. Therefore, it is desirable that the planimetric feature data structure showing the road sign preferentially with respect to other features is configured as described above.

As an example of a method for determining the importance of a planimetric feature, it may be determined depending on the sensing purpose. For example, there are methods in which when sensing for the purpose of acquiring road information, the importance of on-route planimetric features such as signs and traffic lights is increased, and when sensing for the purpose of acquiring facility information around the road, the importance of surrounding planimetric features such as buildings (houses, stores) and signboards is increased. It is possible to determine the importance of the planimetric feature by other methods.

The communication unit 302 includes a circuit and an antenna for communicating with a network such as the Internet or a public line, and communicates with the communication unit 2 of the sensor control device 1 provided in each of the plurality of vehicles 100 to transmit and receive information. At this time, the external server 300 acquires the current position information acquired by the sensor control device 1 by the current position acquisition unit 3 through communication between the communication unit 302 and the communication unit 2. Accordingly, the communication unit 302 functions as a position information acquisition unit that acquires position information of the vehicle 100 in which the sensors 20A to 20D are arranged.

Further, the external server 300 transmits the planimetric feature data to the sensor control device 1 as described later by communication between the communication unit 302 and the communication unit 2. Accordingly, the communication unit 302 functions as a transmission unit that transmits the planimetric feature data to the vehicle 100 in which the sensors 20A to 20D are arranged.

The control unit 303 is configured by a CPU (Central Processing Unit) having a memory such as a RAM (Random Access Memory) and a ROM (Read Only Memory), and controls the external server 300 as a whole.

Figure 4:
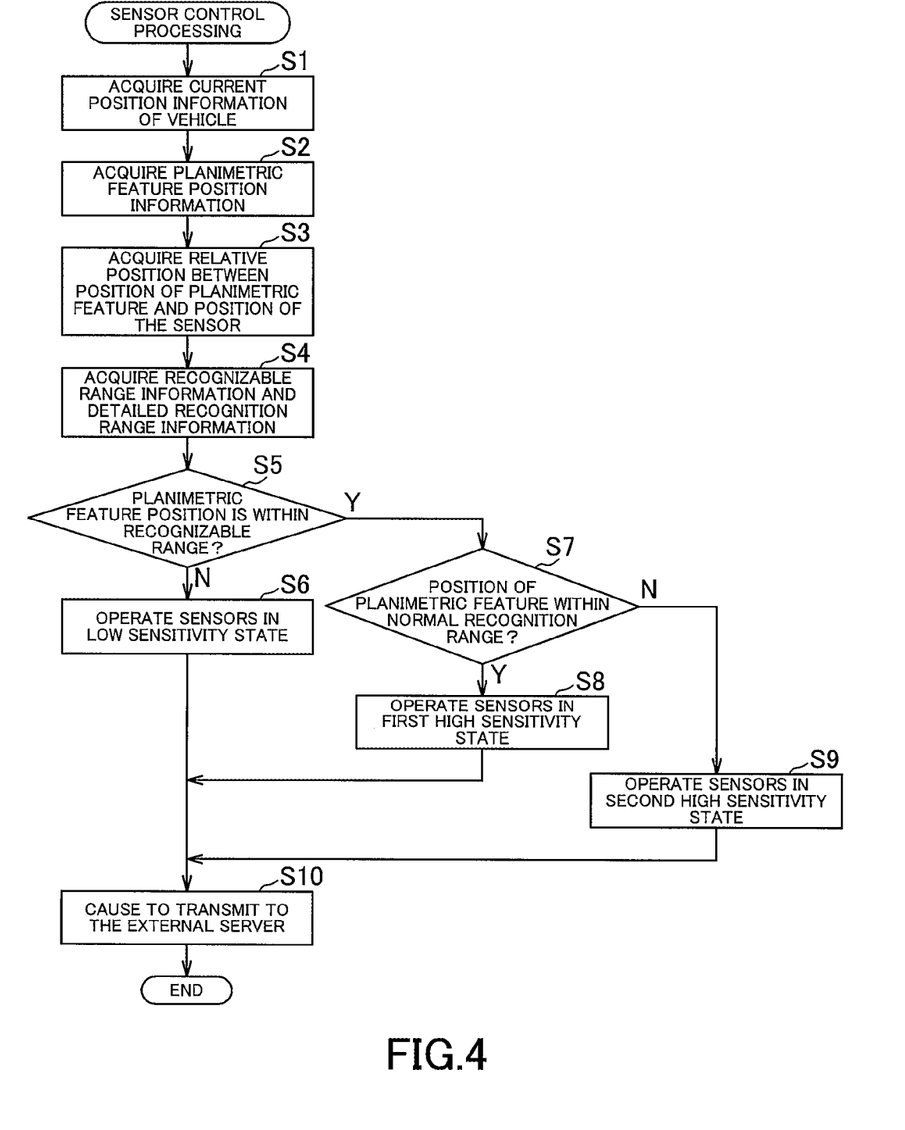
FIG. 4 is a flowchart showing an example of a procedure of sensor control processing executed by the sensor control device.

Here, the procedure in which the control unit 4 executes the sensor control process shown in FIG. 4 will be described. While the vehicle is traveling, the control unit 4 executes the sensor control process at an appropriate timing (for example, every time a predetermined time elapses or every time the vehicle travels a predetermined distance). Note that the sensor control process may be executed independently for each of the sensors 20A to 20D. In the sensor control process, the control unit 4 first acquires the current position information of the vehicle by the current position acquisition unit 3 (step S1). Next, the control unit 4 extracts, from the planimetric feature information stored in the storage unit 5 (that is, as will be described later, planimetric feature information acquired and stored in advance from the external server 300), planimetric feature information indicating the planimetric feature predicted to exist around the current position, and acquires the planimetric feature position information included in the planimetric feature information (step S2). Here, in step S2, the control unit 4 may extract planimetric feature non-existence information indicating that the planimetric feature has been removed as planimetric feature information around the current position, and may acquire planimetric feature position information (information of a position where no planimetric feature exists). Next, the control unit 4 calculates a relative position between the position indicated by the planimetric feature position information and the position of the sensor based on the planimetric feature position information and the current position information (distance between the position indicated by the planimetric feature position information and the sensor position) (step S3, first acquisition step). Next, the control unit 4 acquires recognizable range information and detailed recognition range information from the storage unit 5 (step S4, second acquisition step).

Next, the control unit 4 determines whether or not the position indicated by the planimetric feature position information is within the recognizable range based on the calculated relative position (step S5). When the position indicated by the planimetric feature position information is outside the recognizable range (N in Step S5), the control unit 4 operates the sensors 20A to 20D in the low sensitivity state to acquire the sensor acquisition information (Step S6, control process).

On the other hand, when the position indicated by the planimetric feature position information is located within the recognizable range (Y in step S5), the control unit 4 determines whether or not the position indicated by the planimetric feature position information is within the normal recognition range (step S7). When the position indicated by the planimetric feature position information is within the normal recognition range (Y in step S7), the control unit 4 operates the sensors 20A to 20D in the first high sensitivity state to acquire the sensor acquisition information (step S8, control process). On the other hand, when the position indicated by the planimetric feature position information is located outside the normal recognition range (that is, located within the approach recognition range) (N in step S7), the control unit 4 operates the sensors 20A to 20D in the second high sensitivity state to acquire the sensor acquisition information (step S9, control process).

The control unit 4 holds the sensor acquisition information acquired in steps S6, S8, and S9 in the storage device provided in the sensor control device 1 as it is, or causes the communication unit 2 to transmit to the external server 300 (step S10), and the sensor control process is terminated. When the sensor acquisition information is stored in the storage device, the sensor acquisition information is collectively uploaded to the external server after the travel is completed.

Figure 5:
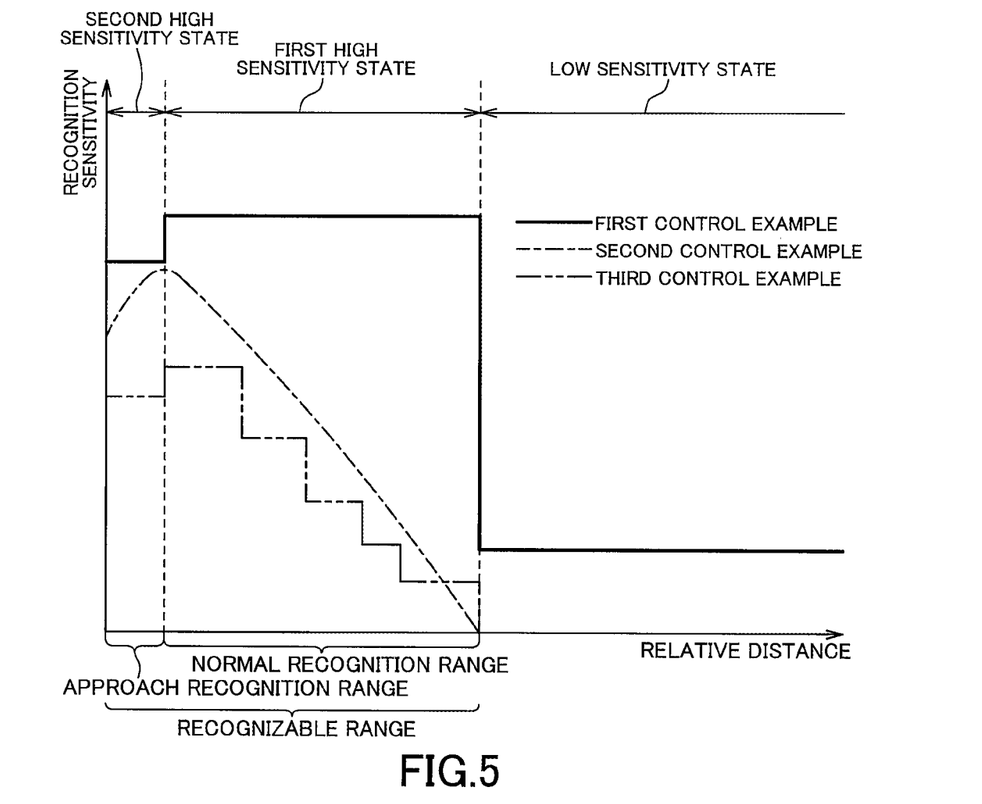
FIG. 5 is a graph showing the sensitivity of a sensor controlled by the sensor control device.

Here, specific examples of the high sensitivity state and the low sensitivity state will be described with reference to FIG. 5. In FIG. 5, the horizontal axis is the distance (relative distance) between the sensors 20A to 20D and the planimetric feature, the vertical axis is the recognition sensitivity of the sensors 20A to 20D, the first control example is indicated by a solid line, the second control example is indicated by a broken line, the third control example is indicated by a one-dot chain line, and the fourth control example is indicated by a two-dot chain line. Note that in FIG. 5, the relationship between the planimetric feature information and the sensitivity state is shown only for the distance, however, it is assumed that the position indicated by the planimetric feature position information is located within the angular range in the direction in which the laser beam can be irradiated.

First, in the first control example, the recognition sensitivity is substantially constant in each of the first high sensitivity state, the second high sensitivity state, and the low sensitivity state, and is not zero in the low sensitivity state (that is, the sensors 20A to 20D are working). Further, the recognition sensitivities in the first high sensitivity state and the second high sensitivity state are higher than the recognition sensitivity in the low sensitivity state, and the recognition sensitivity in the first high sensitivity state is higher than the recognition sensitivity in the second high sensitivity state.

In the second control example, the recognition sensitivity increases as the relative distance decreases in the first high sensitivity state, decreases as the relative distance decreases in the second high sensitivity state, and is zero in the low sensitivity state. Further, in the first high sensitivity state and the second high sensitivity state, the recognition sensitivity graph has an upward convex curve.

In the third control example, the recognition sensitivity increases stepwise (discontinuously) as the relative distance decreases in the first high sensitivity state, is substantially constant in the second high sensitivity state, and is zero in the low sensitivity state.

As shown in the above first to third control examples, the recognition sensitivity may change according to the relative distance in each sensitivity state, or may be substantially constant. Moreover, when the recognition sensitivity changes according to the relative distance, the mode of the change may be set arbitrarily. Further, in the low sensitivity state, the recognition sensitivity may be zero and the sensors 20A to 20D may be turned off (do not operate), or the recognition sensitivity may not be zero and the sensors 20A to 20D may operate. Further, the shape of the graph in each control example may be a straight line, a curve, or a multidimensional polynomial other than the shape shown in FIG. 5.

Figure 6:
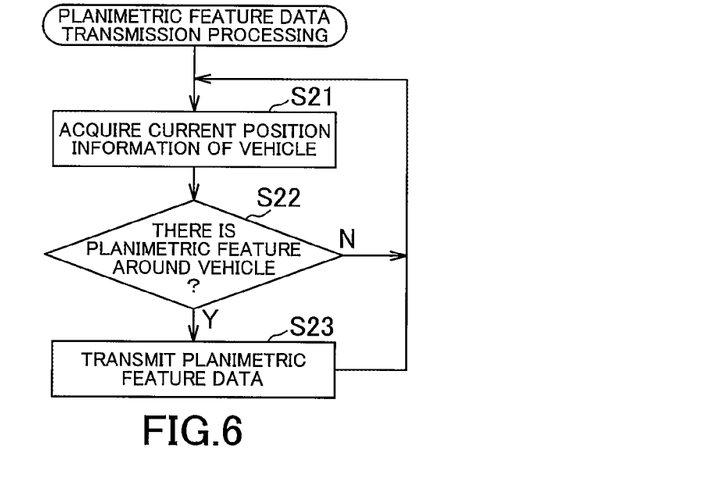
FIG. 6 is a flowchart illustrating an example of a procedure of planimetric feature data transmission processing executed by an external server.

Next, a procedure in which the control unit 303 of the external server 300 executes the planimetric feature data transmission process shown in FIG. 6 will be described. The control unit 303 always executes the planimetric feature data transmission process for all the corresponding sensor control devices 1 during the operation of the external server 300. First, the control unit 303 acquires current position information of the vehicle 100 in which the sensors 20A to 20D are arranged (step S21, position information acquisition step). Next, the control unit 303 determines whether or not there is a planimetric feature around the vehicle 100 (step S22). As a specific example of this determination, the control unit 303 determines whether there is planimetric feature position information included within a predetermined range from the position indicated by the current position information of the vehicle 100 acquired in step S21. Here, "within a predetermined range" refers to a range wider than the recognizable range of the planimetric feature. That is, when the predetermined range and the recognizable range are circles (or spheres), it means that the radius of the circle (or sphere) formed by the predetermined range is longer than the radius of the circle (or sphere) formed by the recognizable range. Further, in step S22, the determination may be made based only on the current position of the vehicle 100, or may be made based also on the moving direction of the vehicle 100. For example, even when the position indicated by the planimetric feature position information of certain planimetric feature information is included within a predetermined range from the current position of the vehicle 100, if the vehicle 100 is moving away from the planimetric feature, it may be determined that the feature is not located around the vehicle 100.

When there is a planimetric feature around the vehicle 100 (Y in step S22), the control unit 303 transmits the planimetric feature data of the planimetric features existing in the vicinity of the vehicle 100 stored in the storage unit main body 301 to the sensor control device 1 (step S23, transmission process), and returns to step S21 again. On the other hand, when there is no feature around the vehicle 100 (N in step S22), the control unit 303 returns to step S21 again. In this way, by transmitting the planimetric feature data to the sensor control device 1, the sensor control device 1 can sense a specific target planimetric feature and acquire current information. When acquiring the planimetric feature data from the external server 300, for example, the control unit 4 of the sensor control device 1 operates the sensors 20A to 20D in steps S5 to S9 of the sensor control process described above by making a determination based on the planimetric feature data. That is, the control unit 4 may operate the sensors 20A to 20D based on the current position information and the recognized information or permission information included in the acquired planimetric feature data.

Figure 7:
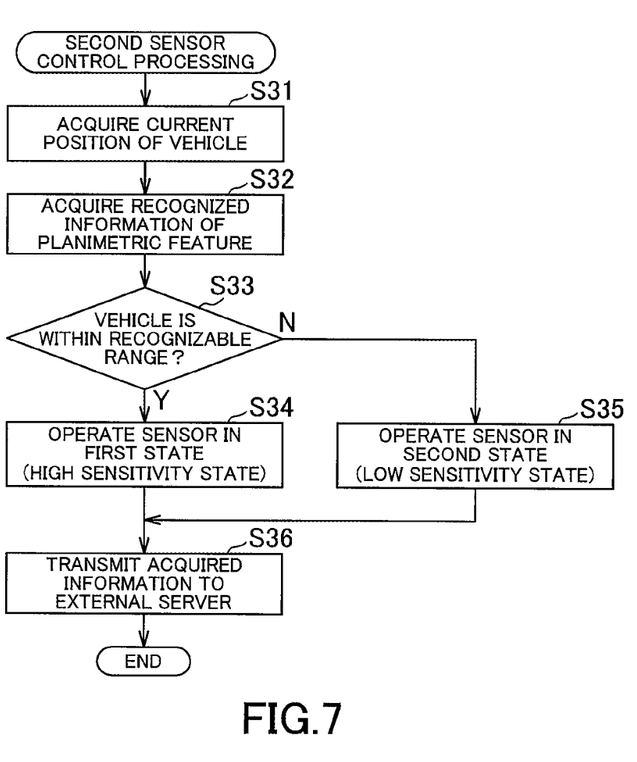
FIG. 7 is a flowchart illustrating an example of a procedure of second sensor control processing executed by the sensor control device.

FIG. 7 shows an example of the procedure of the second sensor control process in which the control unit 4 controls the sensors 20A to 20D when the planimetric feature data is acquired from the external server 300 as described above. In the second sensor control process, the control unit 4 first acquires the current position information of the vehicle by the current position acquisition unit 3 (step S31). Next, the control unit 4 acquires recognized information of the planimetric feature from the external server 300 (step S32). In step S32, the recognized information of the planimetric feature may be acquired by executing step S23 in the planimetric feature data transmission process described above. Next, the control unit 4 determines whether or not the vehicle is located within the recognizable range (step S33). When the vehicle is located within the recognizable range (Y in step S33), the control unit 4 operates the sensors 20A to 20D in the first state (for example, the above-described high sensitivity state). On the other hand, when the vehicle is located outside the recognizable range (N in step S33), the control unit 4 operates the sensors 20A to 20D in the second state (for example, the low sensitivity state described above).

The control unit 4 holds the sensor acquisition information acquired in steps S34 and S35 as it is in the storage device provided in the sensor control device 1, or causes the communication unit 2 to transmit to the external server 300 (step S36), and the second sensor control process is terminated. When the sensor acquisition information is stored in the storage device, the sensor acquisition information is collectively uploaded to the external server after the travel is completed.

With the above configuration, the control unit 4 of the sensor control device 1 controls the sensors 20A to 20D based on the planimetric feature information related to the planimetric features and the sensor information related to the sensors 20A to 20D. Thereby, the sensors 20A to 20D are appropriately operated as necessary, and the detailed current information of the planimetric feature is acquired by the sensors 20A to 20D, and the total data size of the information acquired by the sensors 20A to 20D can be reduced.

Further, when the position indicated by the planimetric feature position information is within the recognizable range, the sensors 20A to 20D are operated in a high sensitivity state. Thereby, the detailed current information of the planimetric feature can be acquired. When the position indicated by the planimetric feature position information is outside the recognizable range, the data size of the information to be acquired can be reduced by operating the sensors 20A to 20D in the low sensitivity state.

Also, when the position indicated by the planimetric feature position information is located within the approach recognition range, the sensitivity is lower than when the position is within the normal recognition range. As a result, it is possible to perform sensing taking into consideration the influence on the human body while acquiring detailed current information of the planimetric feature. In addition, the data size of the information to be acquired can be reduced.

Furthermore, the control unit 4 can control each of the sensors 20A to 20D appropriately by controlling the plurality of sensors 20A to 20D independently.

Since the sensor control device 1 transmits the acquired sensor acquisition information to the external server 300, sensor acquisition information can be collected in the external server 300 and the map data stored in the external server 300 can be updated. Further, each of the plurality of vehicles 100 is provided with the sensor control device 1, and sensor acquisition information is transmitted from each vehicle 100 to one external server 300. Thereby, one map data can be updated widely and frequently, and the accuracy of the map data can be improved.

In addition, the present invention is not limited to the above embodiment, and includes other configurations and the like that can achieve the object of the present invention, and the following modifications and the like are also included in the present invention.

For example, in the above embodiment, the sensor control device 1 transmits sensor acquisition information to the external server 300. However, the sensor control device may use the sensor acquisition information for updating the map data stored in its own storage unit without outputting the sensor acquisition information to the outside.

Further, in the above embodiment, the control unit 4 controls the plurality of sensors 20A to 20D independently. However, for example, a recognizable range by a plurality of sensors may be combined into one area, and the plurality of sensors may be operated uniformly based on whether or not the position indicated by the planimetric feature position information is located in the one area. With such control, the control process can be simplified.

Further, in the above embodiment, when the position indicated by the planimetric feature position information is located within the approach recognition range, the sensitivity is lower than when the position is within the normal recognition range. However, the relationship between the position of the planimetric feature and the sensitivity of the sensor may be set appropriately according to the performance of the sensor. When the position indicated by the planimetric feature position information is located in the recognizable range, the sensitivity of the sensor may be constant, or the sensitivity may be increased as the distance between the planimetric feature and the sensor is closer.

Moreover, in the above example, in step SS5 of sensor control processing, it is determined whether or not the position which planimetric feature position information indicates is located in the recognizable range, and determined whether to be in a high sensitivity state or a low sensitivity state. However, a range narrower than the recognizable range may be defined, and it may be determined whether or not the position indicated by the planimetric feature position information is within this range, and may be determined whether to be in a high sensitivity state or a low sensitivity state.

Further, in the above embodiment, when the position indicated by the planimetric feature position information is within the recognizable range, the sensors 20A to 20D are operated in a high sensitivity state, and when the position indicated by the planimetric feature position information is outside the recognizable range, the sensors 20A to 20D are operated in a low sensitivity state. However, the scan range of the sensor may be changed based on whether or not the position indicated by the planimetric feature position information is within the recognizable range. That is, when the position indicated by the planimetric feature position information is outside the recognizable range, the scan range may be narrowed (including zero), and when the position indicated by the planimetric feature position information is located within the recognizable range, the scan range may be widened to the extent that the current information of the planimetric feature can be acquired in sufficient detail.

Moreover, in the above embodiment, the sensor control device 1 is arranged in the vehicle as a moving object, however, may arranged in other moving objects, such as a ship and an aircraft. The planimetric feature that is the recognition target of the sensor may be an appropriate one according to the path of the moving object in which the sensor control device is arranged.

Further, in the above embodiment, the sensors 20A to 20D are optical sensors. However, the sensor may be any sensor as long as the recognizable range is limited, and may use a sound wave or an electromagnetic wave.

In addition, the best configuration, method and the like for carrying out the present invention have been disclosed in the above description, but the present invention is not limited to these. That is, the present invention has been illustrated and described with particular reference to particular embodiments. However, those skilled in the art can make various modifications to the above-described embodiments in terms of shape, material, quantity, and other detailed configurations without departing from the scope of the technical idea and object of the present invention. Therefore, the description limited to the shape, material, etc. disclosed above is exemplary for easy understanding of the present invention, and does not limit the present invention. Therefore, the description of the names of members excluding some or all of the limitations on the shape, material and the like is included in the present invention.

REFERENCE SIGNS LIST

1 sensor control device
2 communication unit (first acquisition unit, external output unit)
3 current position acquisition unit (current position information acquisition unit)
4 control unit (first acquisition unit, second acquisition unit)
20A to 20D sensor
100 vehicle (moving object)

The invention claimed is:
1. A sensor control device comprising:
a first acquisition unit that acquires planimetric feature information related to a planimetric feature;
a second acquisition unit that acquires sensor information related to a sensor capable of acquiring current information of the planimetric feature; and
a control unit that controls the sensor based on the planimetric feature information acquired by the first acquisition unit and the sensor information acquired by the second acquisition unit
wherein the sensor information includes recognizable range information related to a recognizable range, the recognizable range being an area determined based on at least a distance at which the sensor can recognize the planimetric feature.
2. The sensor control device as claimed in claim 1, further comprising:
a current position information acquisition unit that acquires current position information of the sensor or a moving object in which the sensor is arranged, wherein the planimetric feature information includes planimetric feature position information related to a position of the planimetric feature.

3. The sensor control device as claimed in claim 2, wherein when the position indicated by the planimetric feature position information is within the recognizable range, the control unit operates the sensor in a first state, and when the position indicated by the planimetric feature position information is outside the recognizable range, the control unit operates the sensor in a second state.

4. The sensor control device as claimed in claim 3, wherein the sensor increases at least one of a number of times of measurement in a predetermined scan range and an energy consumption per measurement in the first state larger than in the second state.

5. The sensor control device as claimed in claim 4, wherein the sensor information includes detailed recognition range information related to an approach recognition range in the recognizable range and a normal recognition range outside the approach recognition range in the recognizable range,
wherein, when the position indicated by the planimetric feature position information is located within the normal recognition range, the control unit operates the sensor in a first high sensitivity state, and when the position indicated by the planimetric feature position information is located within the approach recognition range, the control unit operates the sensor in a second high sensitivity state, and
wherein the sensor operates at a lower sensitivity in the second high sensitivity state than in the first high sensitivity state.

6. The sensor control device as claimed in claim 1, wherein the control unit is configured to be capable of controlling a plurality of sensors, and independently controls the plurality of sensors based on the planimetric feature information and the sensor information of each of the plurality of sensors.

7. The sensor control device as claimed in claim 1, further comprising:
an external output unit for outputting the current information acquired by the sensor to an outside.

8. The sensor control device as claimed in claim 1, wherein the sensor includes a projection unit that projects an electromagnetic wave, and a reception unit that receives a reflected wave of the electromagnetic wave from the planimetric feature.

9. The sensor control device as claimed in claim 1, wherein the sensor is arranged in a moving object, and can acquire as the current information, at least one of information related to an on-route planimetric feature located on a route of the moving object and information related to a peripheral planimetric feature located near the route.

10. The sensor control device as claimed in claim 1, wherein the recognizable range is further determined by a longest recognition distance and an angle range of the sensor.

11. A sensor control method used by a sensor control device comprising steps of:
a first acquisition step that acquires planimetric feature information related to a planimetric feature;
a second acquisition step that acquires sensor information related to a sensor capable of acquiring current information of the planimetric feature; and
a control step that controls the sensor based on the planimetric feature information acquired by the first acquisition step and the sensor information acquired by the second acquisition step,
wherein the sensor information includes recognizable range information related to a recognizable range, the recognizable range being an area determined based on at least a distance at which the sensor can recognize the planimetric feature.

12. A non-transitory computer-readable recording medium that stores a sensor control program that causes a computer to execute the sensor control method as claimed in claim 11.

13. A sensor control device comprising:
a first acquisition unit that acquires planimetric feature information;
a third acquisition unit that acquires current position information indicating current position information of a sensor or a moving object in which the sensor is arranged; and
a control unit that controls the sensor based on the planimetric feature information acquired by the first acquisition unit and the current position information acquired by the third acquisition unit, wherein the planimetric feature information includes:
planimetric feature position information related to a position of a planimetric feature; and
recognized information which is associated with the planimetric feature position information and which indicates a recognizable range in which the planimetric feature can be recognized by the sensor.

* * * * *